US00RE47823E

(19) United States
(12) Reissued Patent
Yasuike

(10) Patent Number: US RE47,823 E
(45) Date of Reissued Patent: Jan. 21, 2020

(54) DIRECT-ACTING VALVE LIFTER OF INTERNAL COMBUSTION ENGINE

(71) Applicant: NITTAN VALVE CO., LTD., Kanagawa (JP)

(72) Inventor: Makoto Yasuike, Kanagawa (JP)

(73) Assignee: NITTAN VALVE CO., LTD., Kanagawa (JP)

(21) Appl. No.: 15/949,977

(22) Filed: Apr. 10, 2018

Related U.S. Patent Documents

Reissue of:
(64) Patent No.: 9,657,606
Issued: May 23, 2017
Appl. No.: 14/631,162
Filed: Feb. 25, 2015

U.S. Applications:
(63) Continuation of application No. PCT/JP2012/072158, filed on Aug. 31, 2012.

(51) Int. Cl.
*F01L 1/02* (2006.01)
*F01L 1/14* (2006.01)
*F01L 13/00* (2006.01)

(52) U.S. Cl.
CPC ..... *F01L 1/02* (2013.01); *F01L 1/143* (2013.01); *F01L 13/0036* (2013.01); *F01L 2107/00* (2013.01); *F01L 2810/04* (2013.01)

(58) Field of Classification Search
CPC ..... F01L 1/02; F01L 1/143; F01L 13/0036; F01L 2107/00; F01L 2810/04
See application file for complete search history.

(56) References Cited

U.S. PATENT DOCUMENTS 1,798,508 A * 3/1931 Tucker ..... F01L 1/14 123/90.16
5,231,960 A * 8/1993 White ..... F01L 1/08 123/90.16

(Continued)

FOREIGN PATENT DOCUMENTS

JP 5654204 5/1981
JP 06017610 1/1994

(Continued)

*Primary Examiner* — William C Doerrler
(74) *Attorney, Agent, or Firm* — Fulwider Patton LLP

(57) ABSTRACT

A valve lifter with a variable lift mechanism is required to be deployed at a predetermined angle with respect to a cam unit, and the present invention is intended to achieve this requirement with a simple configuration without too much processing such as a fitting of the conventional longitudinal groove and a pin.

A cam sliding contact surface of a valve lifter on which a high lift cam and a low lift cam slides is formed to be a smooth inclined surface and a cam slide starting point is lower than a cam slide terminating point, thereby establishing an elevation difference between the cam slide starting point and the cam slide terminating point. As a result, since the high lift cam and the low lift cam always move uphill on the cam sliding contact surface, namely, from the low cam slide starting point toward the high cam terminating point along the slope of the cam sliding contact surface, the valve lifter is not subjected to a force around the reciprocating axis from the cam and therefore, the direction of the valve lifter is maintained constant.

8 Claims, 11 Drawing Sheets

(56) References Cited

U.S. PATENT DOCUMENTS

| | | | | | |
|---|---|---|---|---|---|
| 5,832,889 | A * | 11/1998 | Naruoka | F01L 1/143 | 123/90.18 |
| 6,164,256 | A * | 12/2000 | Nakano | F01L 1/143 | 123/90.18 |
| 6,220,209 | B1 * | 4/2001 | Nagaosa | F01L 1/143 | 123/90.1 |
| 2006/0091344 | A1 * | 5/2006 | Pattakos | F01L 1/14 | 251/251 |
| 2009/0090320 | A1 * | 4/2009 | Kim | F01L 1/143 | 123/90.16 |
| 2011/0132305 | A1 * | 6/2011 | Yang | F01L 1/143 | 123/90.48 |
| 2012/0048219 | A1 * | 3/2012 | Choi | F01L 1/143 | 123/90.15 |

FOREIGN PATENT DOCUMENTS

| | | | |
|---|---|---|---|
| JP | 11229837 | * | 8/1999 |
| JP | 11229837 | A | 8/1999 |
| JP | 040114 | * | 2/2007 |
| JP | 040114 | B1 | 2/2007 |
| JP | 08133770 | | 12/2008 |
| JP | 4829562 | * | 12/2011 |
| JP | 4829562 | B2 | 12/2011 |
| WO | 2014033910 | * | 6/2014 |
| WO | 2014033910 | A1 | 6/2014 |

* cited by examiner

AMENDED SHEET

DIRECT-ACTING VALVE LIFTER OF INTERNAL COMBUSTION ENGINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

[This application claims priority to International Patent Application No. PCT/JP2012/072158 filed on Aug. 31, 2012, the entire contents of which are hereby incorporated by reference.] *U.S. Pat. No. 9,657,606 is a continuation of PCT/JP2012/072158 the entirety of which is incorporated herein by reference.*

FIELD OF THE INVENTION

The present invention relates to a cylindrical direct-action valve lifter of an internal combustion engine incorporated in a valve train of the internal combustion engine. Among such valve lifters, the present invention particularly relates to a valve lifter with a variable lift mechanism.

This type of the valve lifter is configured to enable an amount of lift to be altered between a high valve lift and a low valve lift by switching operation of a cam unit integrating a high lift cam and a low lift cam between its high lifter with a high lift cam sliding contact surface and its low lifter with a low lift cam sliding contact surface. Generally, in the case where the lift is high, a high efficiency can be achieved at a high revolution while the efficiency is lowered at a low revolution. To the contrary, in the case where the lift is low, a high efficiency can be achieved at a low revolution while the efficiency is lowered at a high revolution. Therefore, the lift of the valve is switched between a high lift suitable for a high revolution and a low lift suitable for a low revolution.

BACKGROUND OF THE INVENTION

The valve lifter with a variable lift mechanism having the above configuration has to be deployed at a predetermined angle with respect to the cam unit.

One reason is to prevent the cam and the valve lifter from colliding with each other. If the valve lifter rotates around the reciprocating axis and changes the direction thereof, the high lifter deviates from its fixed position and in the case where the internal combustion engine is driven using the low lift cam, the high lift cam comes off the high lifter and crashes into the low lifter to be destroyed.

A second reason is to prevent an oil feeding passage from deviating in position. In the valve lifter with a variable lift mechanism having the above configuration, a cam switching mechanism of the valve lifter is operated by feeding hydraulic pressure from the side of the engine and if the valve lifter rotates and the direction thereof changes, the position of the oil feeding opening on the engine side and that of the oil receiving port on the valve lifter side deviate from each other, whereby the feeding of oil is hindered and the cam switching mechanism acts up.

For these reasons, the valve lifter needs to be deployed at a predetermined angle with respect to the cam unit, in other words, the valve lifter is required to have directionality relative to the cam unit. Conventionally, these needs are satisfied by providing a detent means in the valve lifter.

For example, in FIG. 14 (FIG. 1 of the patent document identified later), a pin 102 is projected from the side surface of the valve lifter 101 so as to engage with a longitudinal groove 104 formed on the inner surface of a cylinder bore 103. The pin 102 and the longitudinal groove 104 constitute a detent means of the valve lifter 101.

The reference numeral 105 in FIG. 14 designates a center lifter which advances and retracts with hydraulic pressure of an oil passage 106 and when the center lifter is located in a retracted position as shown in FIG. 14, a high lift center cam 108 passes through a slit 107 and a low lift cam 109 comes into slidable contact with a low lifter 110. As a result, a valve 111 is opened and closed with low lift. On the other hand, when the center lifter 105 advances into the slit 107 and locates at an advanced position thereof, the high lift center cam 108 comes into slidable contact with the outer surface of the center lifter and the valve 110 is opened and closed with high lift.

In the thus constituted valve lifter with a variable lift mechanism, the same technical advantages can be obtained as those in FIG. 11 by, contrary to the lifter shown in FIG. 14, providing the pin 102 on the side of a bore and providing the longitudinal groove 104 on the side of the valve lifter. In either case, the detent of the valve lifter can be accomplished by engaging the pin with the longitudinal groove.

SUMMARY OF THE INVENTION

The conventional detent means requires too much processing such as the forming of the longitudinal groove, the attachment of the pin and the like, and the detent means is not only troublesome to manufacture the detent means but also complicating in configuration. Therefore, the detent means is inevitably abraded away and degraded in durability. Thus, the conventional detent means gives arise troubles such as the occurrence of a strange sound.

The problem to be solved by the present invention is to achieve the desirable directionality of the valve lifter with a variable lift mechanism without complicating the structure of the valve lifter.

According to the present invention, the cam sliding contact surface with which a high lift cam and a low lift cam come into slidable contact is formed to be a smooth inclined surface and a position of the sliding contact surface at which the cam initially comes into contact is disposed lower than a position of the sliding contact surface at which the cam ceases to be in contact, thereby establishing an elevation difference between these points.

In the present invention, both a high lift cam and a low lift cam slide uphill on an inclined cam sliding contact surface, namely, from a lower region of the sliding contact surface with which the cam initially comes into contact toward a higher region of the sliding contact surface at which the cam ceases to be in contact. As a result, since the sliding locus of the cam on the cam sliding contact surface is along the slope of the inclined surface of the cam sliding contact surface, the valve lifter is not subjected to a force around the reciprocating axis from the cam and therefore, the direction of the valve lifter is maintained constant.

Thus, according to the present invention, unlike the conventional detent means, since the detent can be realized by simply machining the cam sliding contact surface into an inclined surface, thereby reducing the number of components and the weight of the valve lifter. Further, since it is unnecessary to form a longitudinal groove for preventing rotation on the side of the cylinder bore, processing cost can be reduced. Excellent technical advantages such as simplicity of assembling components, ease of fabricating the valve lifter, and enhanced reliability of the valve lifter thanks to elimination of the risk of abrasion and occurrence of a strange sound.

BRIEF DESCRIPTION OF THE DRAWINGS

FIGS. 6 to 8 are explanatory functional diagrams of the valve lifter shown in 1 wherein FIG. 6 is a front view of the valve lifter and FIGS. 7 and 8 are plan views.

FIGS. 9 to 11 are cross sectional views showing cam slidable surfaces of the valve lifters according to embodiments of the present invention, wherein FIG. 9 shows an example in which the cam slidable surface is constituted as a crowned surface, FIG. 10 shows an FIG. 11 shows an example in which the cam slidable surface is constituted as an inclined plane.

DETAILED DESCRIPTION OF THE PREFERRED EMBODIMENTS

Figure 1:
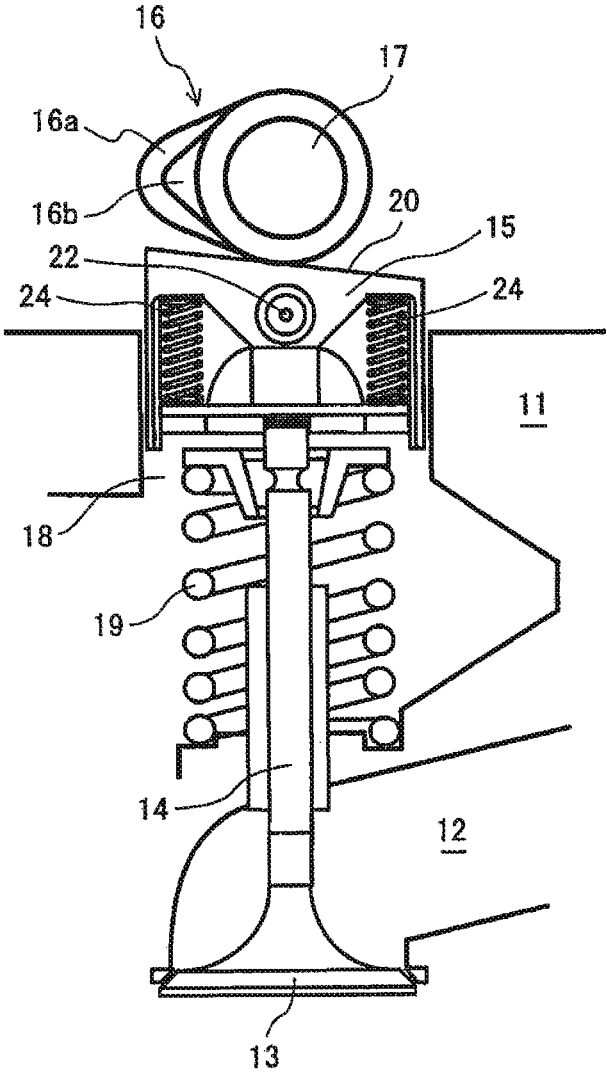
FIG. 1 is a cross sectional view of a portion in the vicinity of a direct acting type valve lifter of an internal combustion engine that is an embodiment of the present invention.

In FIG. 1, the reference numeral 11 designates a cylinder head of an automobile engine and the reference numeral 12 designates an intake port. The reference numerals 13, 14, 15 and 16 designate an intake valve, a valve stem, a valve lifter with a variable lift mechanism and a cam, respectively. The reference numeral 16a designates a high lift cam and the reference numeral 16b designates a low lift cam. The high lift cam 16a and the low lift cam 16b are integrated with a cam shaft 17 for unitization.

The reference numeral 18 designates a cylinder bore and the intake port 12 is closed by pressing the intake valve 13 against the intake port 12 using a coil spring 19 provided in the cylinder bore 18. The cam 16 (16a or 16b) is constituted so as to press the valve lifter 15 downward in FIG. 1 against the spring force of the coil spring 19, thereby opening the intake valve 13. The reference numeral 20 designates a cam sliding contact surface of the valve lifter 15. The cam 16 slides on the cam sliding contact surface 20 to push the valve lifter 15, thereby opening the intake valve 13. This operation is repeated so that the valve lifter 15 linearly reciprocates in the cylinder bore 18.

The cam sliding contact surface 20 of the valve lifter 15 is provided with a high lifter 15a having a high lift cam sliding contact surface 20a and low lifters 15b, 15b having low lift cam sliding contact surfaces 20b, 20b (See FIGS. 2 to 5). These are disposed in such a manner that the high lifter 15a is sandwiched between the low lifters 15b, 15b from either side. When a hydraulic pressure pin 21 laterally penetrating the high lifter 15a is moved by hydraulic pressure, the leading end portion of the hydraulic pressure pin 21 is inserted into the low lifter 15b (See FIG. 4), whereby the high lifter 15a and the right-and-left low lifters 15b, 15b are integrated (See FIG. 5). When the hydraulic pressure pin 21 comes away from the low lifter 15b (See FIG. 2), the high lifter 15a and the low lifter 15b are disconnected from each other so that the high lifter 15a can freely move up and down with respect to the low lifter 15b (See FIG. 3).

Figure 3:
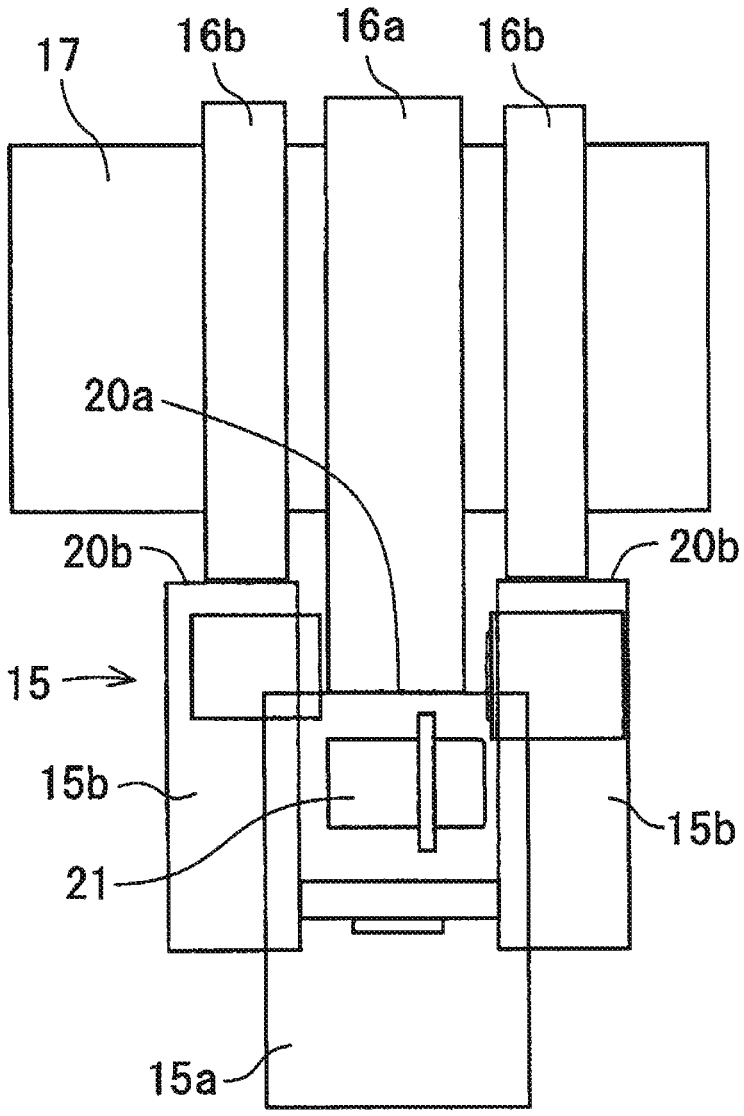
FIG. 3 is a diagram for explaining an operation in the vicinity of the valve lifter shown in FIG. 2.

As apparent from the above, in the state shown in FIG. 3, although the high lift cam 16a is in contact with the high lift cam sliding contact surface 20a, it does not push down the valve lifter 15, in other words, it makes a blank shot. As a result, the low lift cam 16b comes into contact with the low lift cam sliding contact surface 20b and pushes down the valve lifter 15 so that the valve lifter 15 operates to produce a low lift. To the contrary, in the state shown in FIG. 5, the high lifter 15a is integrated with the low lifter 15b and the high lift cam 16a comes into contact with the high lift cam sliding contact surface 20a to push down the valve lifter 15. As a result, the valve lifter 15 operates to produce a high lift.

Figure 2:
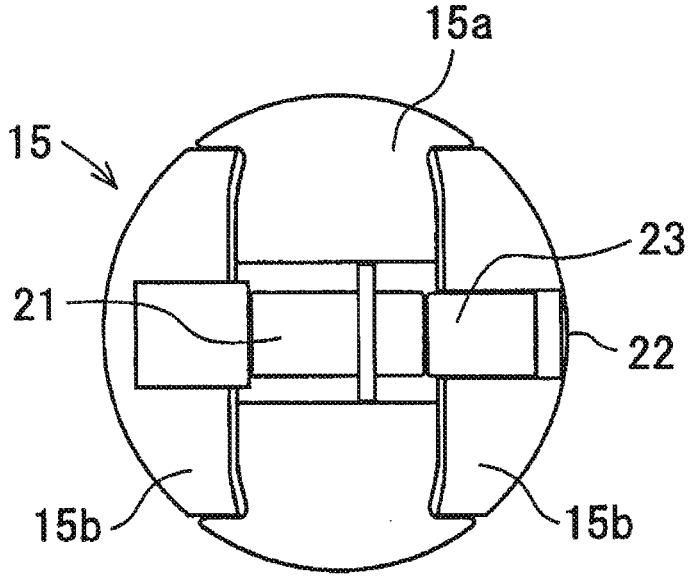
FIG. 2 is an explanatory diagram of an internal mechanism of the valve lifter shown in FIG. 1 in a low lift operation.
Figure 4:
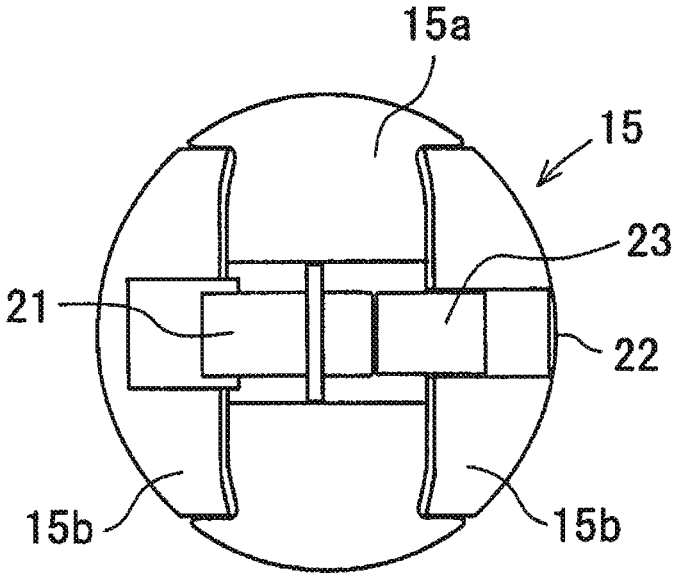
FIG. 4 is an explanatory diagram of an internal mechanism of the valve lifter shown in FIG. 1 in a high lift operation.
Figure 5:
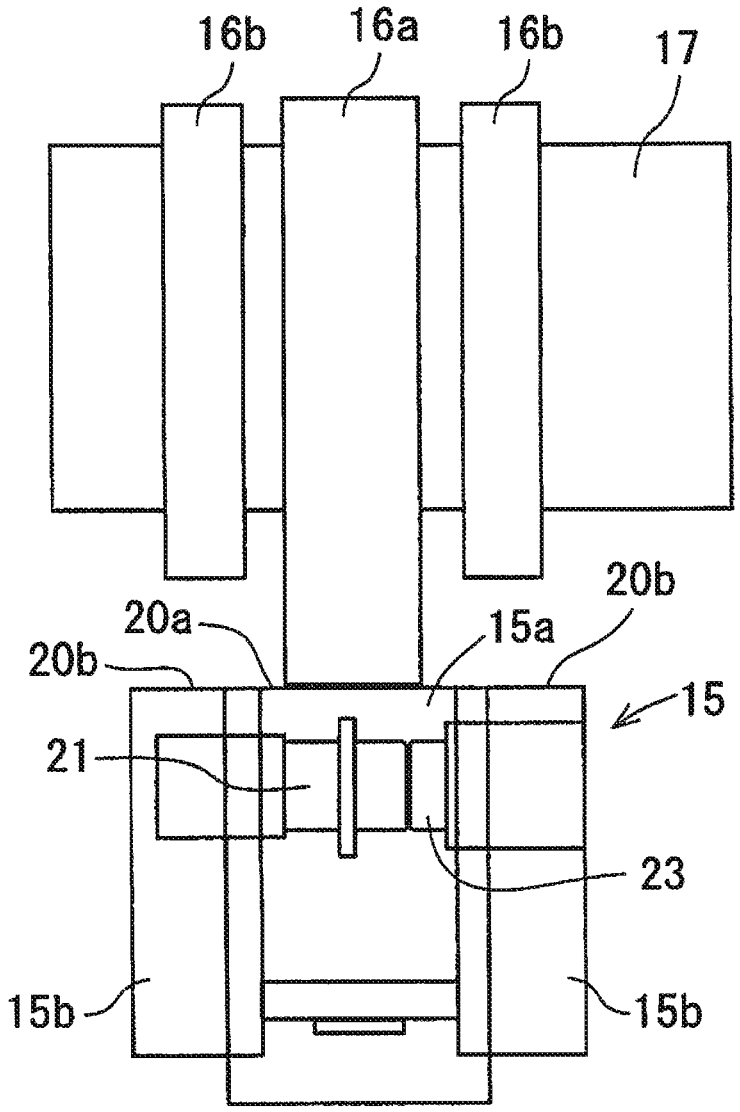
FIG. 5 is a diagram for explaining an operation in the vicinity of the valve lifter shown in FIG. 4.

In FIGS. 1, 2 and 4 the reference numeral 22 designates an opening for receiving oil for generating hydraulic pressure, the reference numeral 23 designates an operating pin for pushing the hydraulic pressure pin 21 and the reference numeral 24 designates a return spring for returning the high lifter 20a to its initial position (the position where the high lift cam sliding contact surface 20a and the low lift cam sliding contact surface 20b are located at the same level).

Here, the cam sliding contact surface 20 (the high lift cam sliding contact surface 20a and/or the low lift cam sliding contact surface 20b) according to the present invention is configured as a smooth inclined surface.

Figure 6:
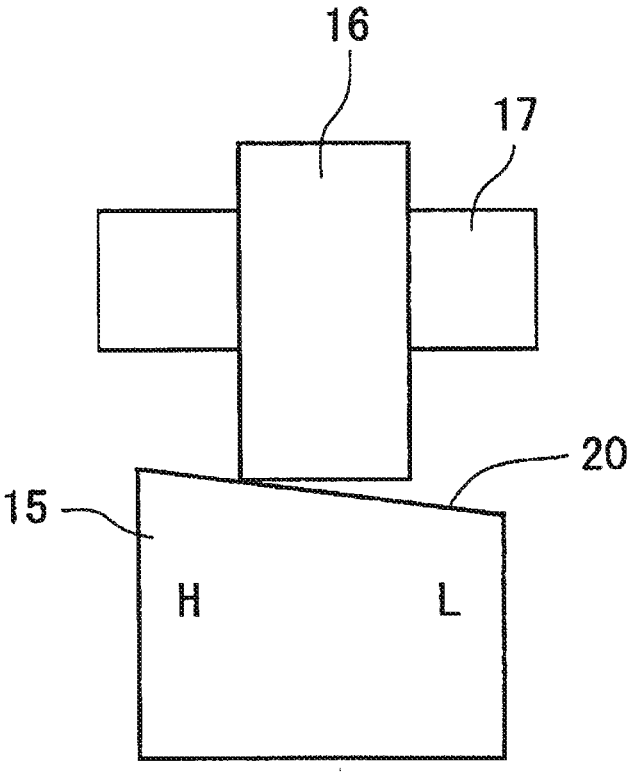
Figure 7:
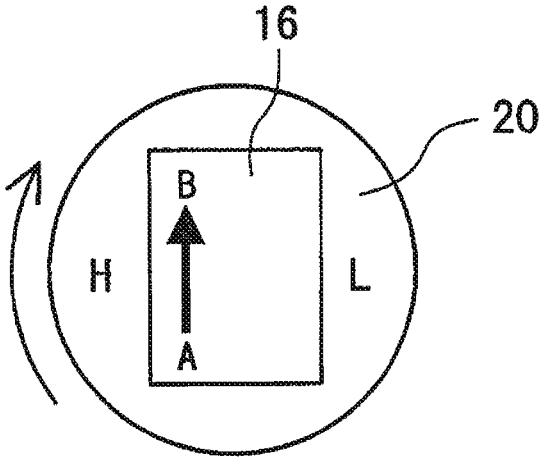

As a result, as shown in FIG. 6, the cam 16 (the high lift cam 16a or the low lift cam 16b) first comes into point contact with a high position H offset from the center of the cam sliding contact surface 20. Assuming this position H to be a cam slide starting point A, the cam 16 slides on the cam sliding contact surface 20 from point A in accordance with the rotation of the cam 16 and the cam 16 until it leaves the cam sliding contact surface 20 at cam slide terminating point B (See FIG. 7). Since a line segment connecting point A and point B is offset from the center of the cam sliding contact surface 20, the valve lifter 15 rotates owing to the friction resistance of the cam 16 in a direction from point A toward point B, namely, the direction (clockwise direction) indicated by an arrow in FIG. 7. In other words, the valve lifter 15 receives clockwise torque from the cam 16. When the valve lifter 15 rotates and the cam slide starting point A arrives at the low position L of the cam sliding contact surface 20, the direction of the friction resistance of the cam 16 from point A toward point B bisects the center line of the valve lifter 15 and no rotational force is any longer applied to the valve lifter 15, whereby the rotation of the valve lifter 15 stops.

The same applies to a case where the cam 16 rotates in the reverse direction.

Figure 8:
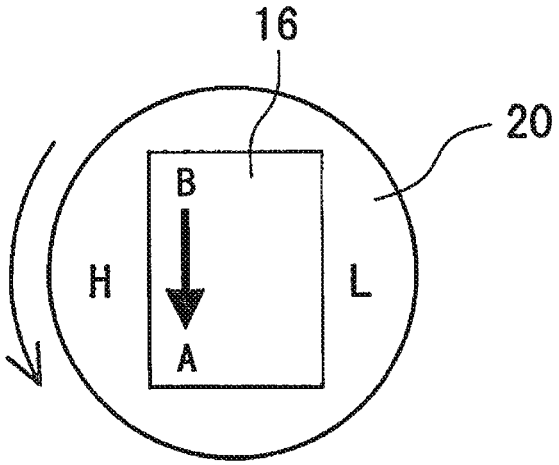

In the case where the cam 16 rotates in the reverse direction, the cam slide starting point corresponds to point B in FIG. 8 and the cam slide terminating point corresponds to point A. At this time, the friction resistance of the cam 16 is applied in the direction from point B toward point A, whereby the valve lifter 15 rotates in the direction (counterclockwise direction) indicated by an arrow in FIG. 8. As a result, when the cam slide starting point B arrives at the low portion L of the cam sliding contact surface 20, no rotational force is any longer applied to the valve lifter 15, whereby the rotation of the valve lifter 15 stops.

As apparent from the above, according to the present invention, since the cam sliding contact surface 20 is configured as an inclined surface, the cam slide starting point arrives at the low position L of the cam sliding contact surface 20 and the rotation of the valve lifter 15 stops, irrespective of the rotational direction of the cam 16.

Figure 10:
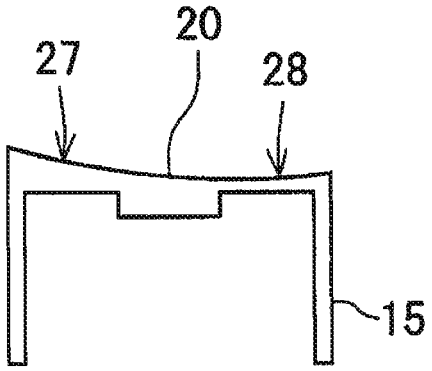
Figure 11:
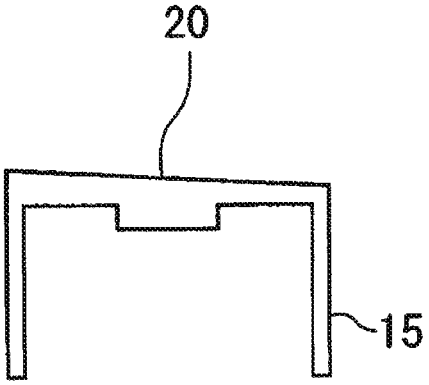

The inclined surface of the cam sliding contact surface 20 is not limited to a flat surface (See FIG. 11). The inclined surface of the cam sliding contact surface 20 may be configured as a crowned shape (See FIG. 9) or as a reverse crowned shape (See FIG. 10). In short, it is sufficient for the cam slide starting point to be lower than the cam slide terminating point, whereby an elevation difference is present between the cam slide starting point and the cam slide terminating point.

Figure 9:
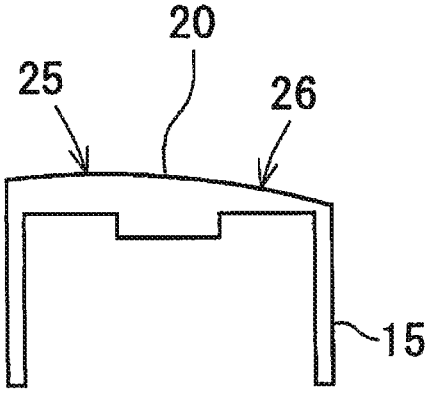

As shown in FIG. 9, in the case where the inclined surface of the cam sliding contact surface 20 is formed to have the crowned shape, the cam sliding contact surface 20 is formed so that the left half thereof with respect to the center thereof is formed as a horizontal plane 25 and the right half thereof is formed as a declivitous plane 26. The border between the horizontal plane 25 and the declivitous plane 26 is continuously connected by a smooth curved plane so that the cam sliding contact surface 20 has a crowned shape in which the central portion is high as a whole. As a result, the cam slide starting point A where the cam 16 comes into contact with the cam sliding contact surface 20 becomes lower than the cam slide terminating point B where the cam 16 leaves the cam sliding contact surface 20.

FIG. 10 shows the cam sliding contact surface 20 having a reverse crowned shape. More specifically, the cam sliding contact surface 20 is formed so that the right half thereof with respect to the center thereof is formed as a declivitous plane 27 and the left half thereof is formed as a horizontal plane 28. The border between the declivitous plane 27 and the horizontal plane 28 is continuously connected by a smooth curved plane so that the cam sliding contact surface 20 has a reverse crowned shape in which the central portion is low as a whole.

In the example in which the cam sliding contact surface 20 has the reverse crowned shape, similarly to in the case of the cam sliding contact surface 20 having the crowned shape, the cam slide starting point becomes lower than the cam slide terminating point B.

In the case where the outer diameter of the valve lifter 15 is equal to 30 mm, it is necessary for the elevation difference to exceed 15 μm and it is preferable for the elevation difference to be equal to or larger than 30 μm. By calculations, the mean gradient is equal to or larger than 0.05% (=0.015/30×100).

Moreover, there are valve lifters with a variable lift mechanism which are different in arrangement relationship between the high lifter having the high cam sliding contact surface and the low lifter having the low cam sliding contact surface.

Figure 12:
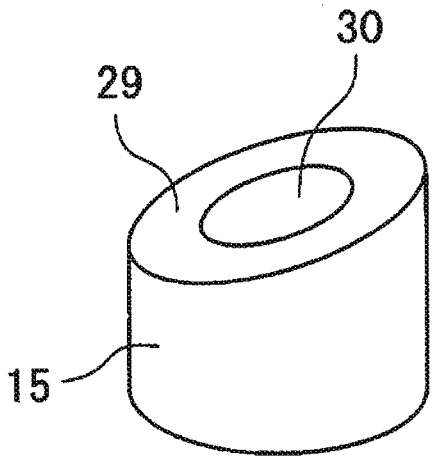
FIGS. 12 and 13 are perspective views of the valve lifters according to other embodiments of the present invention.
Figure 13:
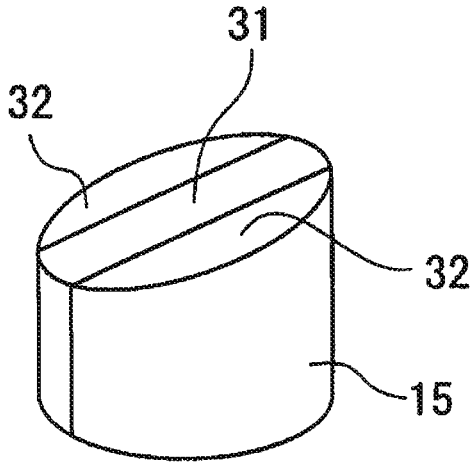
Figure 14:
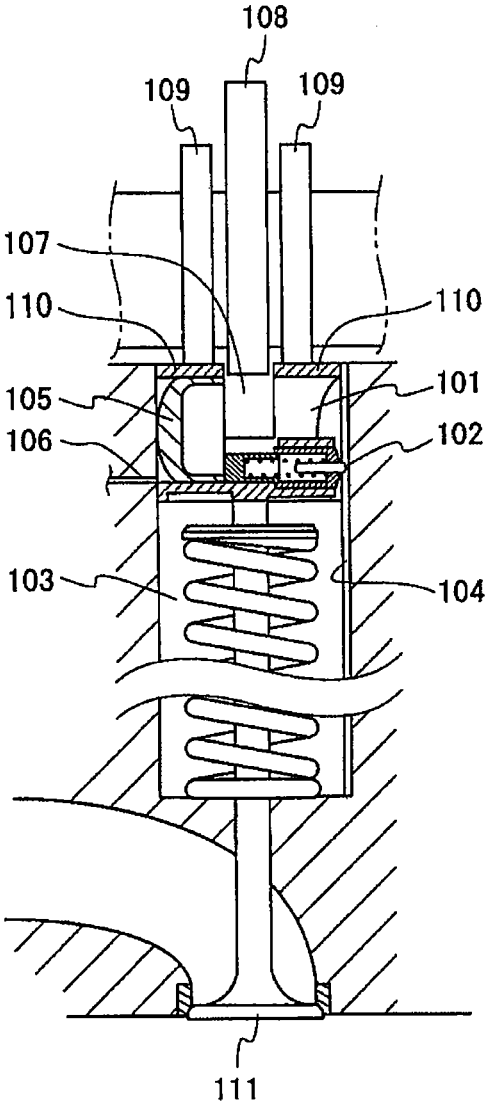
FIG. 14 PRIOR ART
FIG. 14 is a cross sectional view of a conventional valve lifter and vicinity.

FIG. 12 shows an example in which a low lifter 30 is disposed inside of an annular high lifter 29 and FIG. 13 shows an example in which arc-like low lifters 32 are disposed on opposite sides of a rectangular high lifter 31. The cam sliding contact surface according to the present invention includes these arrangements of the high lifter and the low lifter shown in FIGS. 12 and 13.

The present invention can be widely applied to a valve lifter with a variable lift mechanism built in an internal combustion engine of, for example, an automobile, industrial vehicle or the like.

The reference numeral 11 designates a cylinder head, the reference numeral 12 designates an intake port, the reference numeral 13 designates an intake valve, the reference numeral 14 designates a valve stem, the reference numeral 15 designates a valve lifter, the reference numeral 16 designates a cam, the reference numeral 18 designates a cylinder bore, the reference numeral 19 designates a coil spring, the reference numeral 20 designates a cam sliding contact surface, the reference symbol A designates a cam slide starting point on the cam sliding contact surface, and the reference symbol B designates a cam slide terminating point on the cam sliding contact surface, respectively.

What is claimed:

1. A cylindrical direct-acting valve lifter of an internal combustion engine with a variable lift mechanism which can switch between a high lifter comprising a high lift cam sliding surface with which a high lift cam comes into slidable contact and low lifter comprising a low lift cam sliding surface with which a low lift cam comes into slidable contact, wherein;

the high lift cam sliding surface and the low lift cam sliding surface are integrally formed with an upper surface of the valve lifter and are formed as inclined surfaces whose surface roughness is smooth;

each of the inclined surfaces of the cam sliding contact surfaces is formed by a flat surface inclined with respect to a plane perpendicular to a reciprocating direction of the valve lifter and a cam slide starting point on the cam sliding contact surface that is the inclined surface is positioned to be lower than a cam slide terminating point thereon; and the high lift cam and the low lift cam come into point contact with [a] *the* cam slide starting point on the cam sliding contact surface that is higher than a center of the cam sliding contact surface, the high lifter and the low lifter rotate due to friction resistance generated by a rotation of the high lift cam and the low lift cam, the cam slide starting point is arrived to a lower position on the cam sliding contact surface and the rotation of the high [lift cam] *lifter* and the low [lift cam] *lifter* stops, and the high lift cam and the low lift cam moves along the inclined surface of the cam sliding contact surface to the cam slide terminating point that is higher than the cam slide starting point.

2. A cylindrical direct-acting valve lifter of an internal combustion engine with a variable lift mechanism which can switch between a high lifter comprising a high lift cam sliding surface with which a high lift cam comes into slidable contact and low lifter comprising a low lift cam sliding surface with which a low lift cam comes into slidable contact, wherein;

the high lift cam sliding surface and the low lift cam sliding surface are integrally formed with an upper surface of the valve lifter and are formed as inclined surfaces whose surface roughness is smooth;

each of the inclined surfaces of the cam sliding contact surfaces is formed by a crowned surface and a cam slide starting point on the cam sliding contact surface is positioned to be lower than a cam slide terminating point thereon; and the high lift cam and the low lift cam come into point contact with [a] *the* cam slide starting point on the cam sliding contact surface that is higher than a center of the cam sliding contact surface, the high lifter and the low lifter rotate due to friction resistance generated by a rotation of the high lift cam and the low lift cam, the cam slide starting point is arrived to a lower position on the cam sliding contact surface and the rotation of the high [lift cam] *lifter* and the low [lift cam] *lifter* stops, and the high lift cam and the low lift cam moves along the inclined surface of the cam sliding contact surface to the cam slide terminating point that is higher than the cam slide starting point.

3. A cylindrical direct-acting valve lifter of an internal combustion engine with a variable lift mechanism which can switch between a high lifter comprising a high lift cam sliding surface with which a high lift cam comes into slidable contact and low lifter comprising a low lift cam sliding surface with which a low lift cam comes into slidable contact, wherein;

the high lift cam sliding surface and the low lift cam sliding surface are integrally formed with an upper surface of the valve lifter and are formed as inclined surfaces whose surface roughness is smooth;

each of the inclined surfaces of the cam sliding contact surfaces is formed by a reverse-crowned surface and a cam slide starting point on the cam sliding contact surface is positioned to be lower than a cam slide terminating point thereon; and the high lift cam and the low lift cam come into point contact with [a] *the* cam slide starting point on the cam sliding contact surface that is higher than a center of the cam sliding contact surface, the high lifter and the low lifter rotate due to friction resistance generated by a rotation of the high lift cam and the low lift cam, the cam slide starting point is arrived to a lower position on the cam sliding contact surface and the rotation of the high [lift cam] *lifter* and the low [lift cam] *lifter* stops, and the high lift cam and the low lift cam moves along the inclined surface of the cam sliding contact surface to the cam slide terminating point that is higher than the cam slide starting point.

4. The cylindrical direct-acting valve lifter of an internal combustion engine of claim 1, wherein:

a hydraulic pressure pin laterally penetrating the high lifter is provided so that the high lifter and the low lifter can be switched by moving the hydraulic pressure pin so as to insert a leading end portion into the low lifter, thereby integrating the high lifter and the low lifter, or moving the hydraulic pressure pin away from the low lifter, thereby disconnecting the high lifter and the low lifter.

5. The cylindrical direct-acting valve lifter of an internal combustion engine of claim 2, wherein:

a hydraulic pressure pin laterally penetrating the high lifter is provided so that the high lifter and the low lifter can be switched by moving the hydraulic pressure pin so as to insert a leading end portion into the low lifter, thereby integrating the high lifter and the low lifter, or moving the hydraulic pressure pin away from the low lifter, thereby disconnecting the high lifter and the low lifter.

6. The cylindrical direct-acting valve lifter of an internal combustion engine of claim 3, wherein:

a hydraulic pressure pin laterally penetrating the high lifter is provided so that the high lifter and the low lifter can be switched by moving the hydraulic pressure pin so as to insert a leading end portion into the low lifter, thereby integrating the high lifter and the low lifter, or moving the hydraulic pressure pin away from the low lifter, thereby disconnecting the high lifter and the low lifter.

7. The cylindrical direct-acting valve lifter of an internal combustion engine of claim 2, wherein:

one half of the crowned surface with respect to a center thereof is formed as a horizontal plane and another half of the crowned surface is formed as a declivitous plane, and a border between the horizontal plane and the declivitous plane is continuously connected by a smooth curved plane.

8. The cylindrical direct-acting valve lifter of an internal combustion engine of claim 3, wherein:

one half of the reverse-crowned surface with respect to a center thereof is formed as a declivitous plane and another half of the reverse-crowned surface is formed as a horizontal plane, and a border between the declivitous plane and the horizontal plane is continuously connected by a smooth curved plane.

* * * * *